US011364976B2

(12) United States Patent
Grayson (10) Patent No.: US 11,364,976 B2
(45) Date of Patent: Jun. 21, 2022

(54) BRACKET AND SYSTEM FOR SUPPORT AND SECURITY OF ELONGATED ITEMS

(71) Applicant: Paul Grayson, La Jolla, CA (US)

(72) Inventor: Paul Grayson, La Jolla, CA (US)

(*) Notice: Subject to any disclaimer, the term of this patent is extended or adjusted under 35 U.S.C. 154(b) by 675 days.

(21) Appl. No.: 16/328,102

(22) PCT Filed: Oct. 9, 2018

(86) PCT No.: PCT/US2018/055049
§ 371 (c)(1),
(2) Date: Feb. 25, 2019

(87) PCT Pub. No.: WO2019/074948
PCT Pub. Date: Apr. 18, 2019

(65) Prior Publication Data
US 2021/0362812 A1  Nov. 25, 2021

Related U.S. Application Data (60) Provisional application No. 62/569,761, filed on Oct. 9, 2017.

(51) Int. Cl.
 *F16M 13/02*  (2006.01)
 *B63B 32/83*  (2020.01)
 *F16G 11/14*  (2006.01)

(52) U.S. Cl.
 CPC .............. *B63B 32/83* (2020.02); *F16G 11/14* (2013.01); *F16M 13/022* (2013.01)

(58) Field of Classification Search
 CPC ........ B60R 9/08; B63B 32/83; F16M 13/022; A47F 5/0838
 See application file for complete search history.

(56) References Cited

U.S. PATENT DOCUMENTS

| | | | |
|---|---|---|---|
| 5,388,738 A | 2/1995 | Russell | |
| 5,673,889 A * | 10/1997 | DeValcourt | B60R 9/08 224/319 |
| 6,056,274 A | 5/2000 | Naas et al. | |
| 6,189,753 B1 | 2/2001 | Kalhok et al. | |
| 6,886,791 B2 * | 5/2005 | Dettorre | A47B 81/00 248/201 |
| 8,251,331 B2 * | 8/2012 | Fowler | F16M 13/022 248/316.8 |
| 8,622,266 B2 * | 1/2014 | McMillan | B60R 9/0485 224/323 |
| 8,746,469 B1 * | 6/2014 | De La Torre | B60R 9/08 211/70.8 |
| 8,869,998 B2 * | 10/2014 | Ferre | B63B 32/83 211/85.7 |
| 9,157,567 B1 * | 10/2015 | Calabrese | A45C 13/001 |

(Continued)

*Primary Examiner* — Bradley Duckworth
(74) *Attorney, Agent, or Firm* — McDonnell Boehnen Hulbert & Berghoff LLP (57) ABSTRACT

An apparatus for mounting an item on a horizontal rail is disclosed. The apparatus may include a bracket having a hanger portion, a support portion, an elongated body extending from the hanger portion to the support portion, and a retaining strap that runs from the hanger portion to the support portion. Also disclosed is a system for mounting an item on a horizontal rail. The system may include a bracket having a hanger portion, a support portion, an elongated body extending from the hanger portion to the support portion, a retaining strap, and the item.

18 Claims, 5 Drawing Sheets

(56) References Cited

U.S. PATENT DOCUMENTS

| | | | |
|---|---|---|---|
| 9,346,409 B2* | 5/2016 | Pfaeffli | B60R 9/08 |
| 9,527,562 B1 | 12/2016 | Sterling | |
| 9,618,143 B2* | 4/2017 | Noble | F16L 3/243 |
| 9,930,965 B2* | 4/2018 | Peterson | B63B 32/83 |
| 2006/0186153 A1 | 8/2006 | Ilgenfritz | |
| 2008/0272165 A1* | 11/2008 | McMillan | B60R 9/00 |
| | | | 224/408 |
| 2012/0091178 A1* | 4/2012 | Hancock | B62J 7/06 |
| | | | 224/401 |
| 2016/0114734 A1 | 4/2016 | Ferré-Rangel et al. | |
| 2016/0257404 A1* | 9/2016 | Ferris | F16M 11/10 |

* cited by examiner

BRACKET AND SYSTEM FOR SUPPORT AND SECURITY OF ELONGATED ITEMS

CROSS-REFERENCE TO RELATED APPLICATIONS

The present application is a national stage entry of PCT/US2018/055049, filed Oct. 9, 2018, which claims the benefit of, and priority to, U.S. Provisional Patent Application No. 62/569,761 filed on Oct. 9, 2017, the contents of each of which are hereby incorporated entirely herein by reference.

BACKGROUND

Unless otherwise indicated herein, the materials described in this section are not prior art to the claims in this application and are not admitted to be prior art by inclusion in this section.

The use of non-motorized modes of short-distance waterway transportation has gained in popularity in recent years. Kayaks, surfboards, and stand-up paddle boards are used by millions of people each year, but their large, bulky size makes transporting and storing these items burdensome. This is particularly the case on boats, where space is at a premium. Thus, a convenient storage apparatus for these items, particularly on a boat, would serve very useful.

SUMMARY

In one aspect, an apparatus for mounting an item on a horizontal rail is disclosed. The apparatus may include a bracket having a hanger portion, a support portion, an elongated body extending from the hanger portion to the support portion, and a retaining strap that runs from the hanger portion to the support portion.

In another aspect, a system for mounting an item on a horizontal rail is disclosed. The system may include a bracket having a hanger portion, a support portion, an elongated body extending from the hanger portion to the support portion, a retaining strap and an item. The hanger portion of the bracket may contact the rail, while the item contacts the support portion of the bracket. The retaining strap can be run through the hanger portion and the support portion. The retaining strap can contact the item and secure the item to the bracket while simultaneously securing the bracket to the rail.

These as well as other aspects, advantages, and alternatives, will become apparent to those of ordinary skill in the art by reading the following detailed description, with reference where appropriate to the accompanying drawings.

DETAILED DESCRIPTION

The following detailed description describes various features and functions of the disclosed systems and methods with reference to the accompanying figures. In the figures, similar symbols typically identify similar components, unless context dictates otherwise. The illustrative apparatus and system embodiments described herein are not meant to be limiting. It will be readily understood that certain aspects of the disclosed apparatus and system can be arranged and combined in a wide variety of different configurations, all of which are contemplated herein.

The term "rail" as used herein refers to any elongated structural member, such as a bow rail, hand rail or thin structural beam, with a substantially horizontal portion that can accommodate a hanging bracket. The rail may be substantially cylindrical, oval, square or rectangular, and have rounded or straight angles. The rail may be fixed to a stationary object or a transportation vehicle. The transportation vehicle may include a marine vessel, such as a boat, yacht, house boat, sail boat or pontoon boat.

The term "holes" as used herein can have any shape and size, as long as they are large enough to allow the retaining strap to pass through, but small enough so that the corresponding portion of the bracket retains its structural integrity. For example, the holes can be substantially circular, oval, square, rectangular or triangular, and have rounded or straight angles.

The term "substantially" when used herein in a numerical context means+/−5%.

In one aspect, an apparatus for mounting an item on a rail is disclosed. The apparatus may include a bracket and a retaining strap, and the item may have an elongated shape. Mounting systems known in the art require hardware (e.g., screws, nuts, bolts, etc.) to permanently attach a bracket to a rail, or use multiple straps, one to attach a bracket to a rail, and another to strap an item to the bracket. In certain embodiments, the apparatus disclosed herein is designed to employ a single strap to both secure the bracket to the rail, and the item to the bracket. The item may include any elongated object, and the bracket and strap can be designed to accommodate any size item. For example, the item may be a water sports related item, such as, but not limited to a waterski, wakeboard, hydrofoil, kayak, surfboard, paddleboard or floating mat.

The apparatus may include:
a bracket comprising:
  a hanger portion comprising a proximal end, a first curved section, a distal end, and a first hole extending through the proximal end;
  a support portion comprising a second curved section; and
  an elongated body extending from the hanger portion to the support portion; and
a retaining strap coupled to the distal end of the hanger portion, extending through the first hole of the hanger portion and coupled to the support portion.

Figure 1:
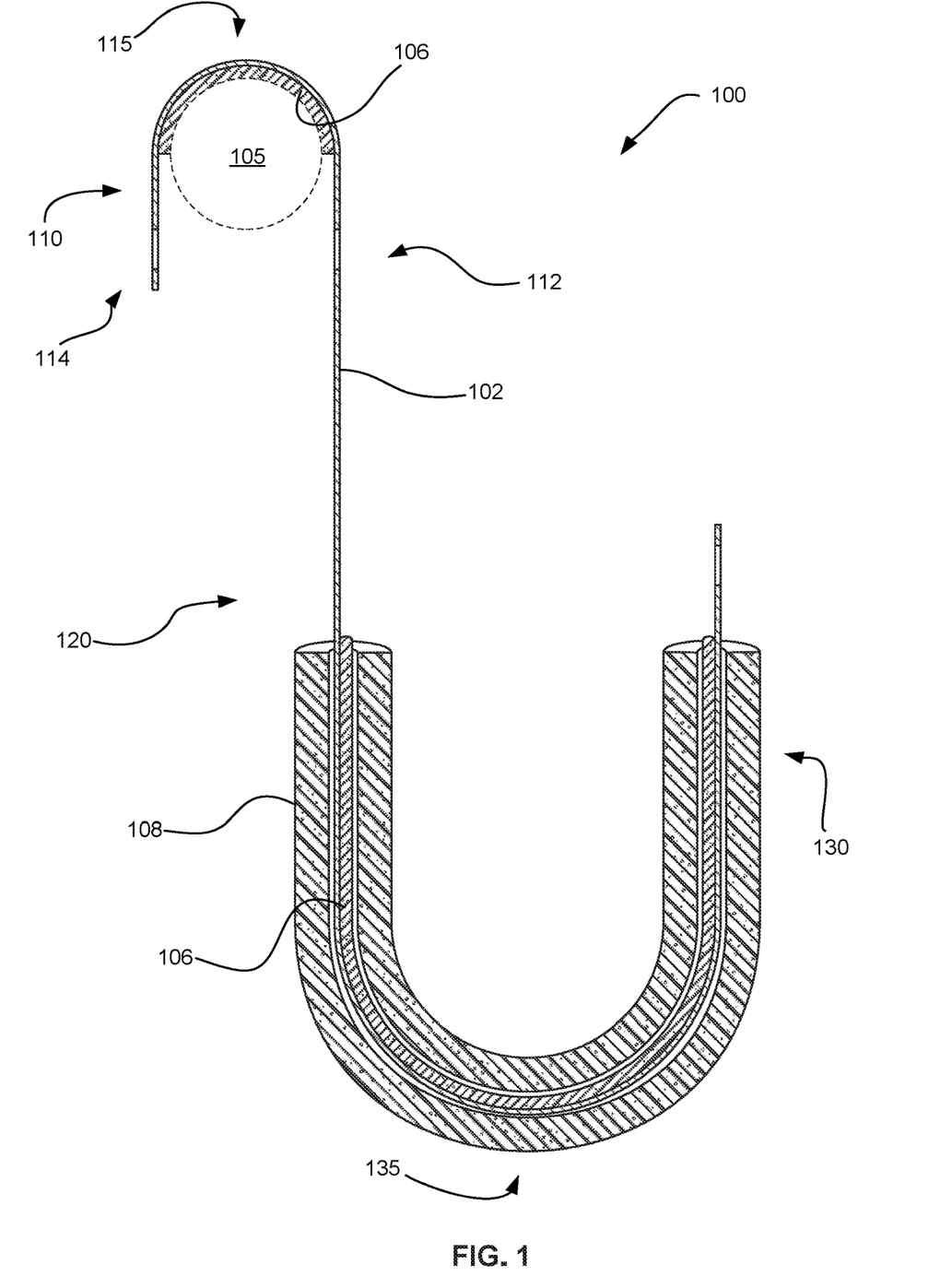
FIG. 1 is a side view of a bracket according to an embodiment of the disclosure.

FIG. 1 is a side view of a bracket 100. The bracket 100 includes a frame 102 that forms a hanger portion 110, an elongated body 120, and a support portion 130. The hanger portion 110 includes a first curved section 115, which can be designed to attach to, or hang over, a rail 105. The elongated body 120 extends from the hanger portion 110 to the support portion 130 which includes a second curved section 135.

The hanger portion 110 of bracket 100 has a proximal end 112 that is adjacent to the elongated body and a distal end 114. The first curved section 115 of hanger portion 110 is disposed between proximal end 112 and distal end 114, such that proximal end 112 and distal end 114 extend in different directions. In the embodiment shown in FIG. 1, proximal end 112 extends upward, continuing the extension of elongated body 120, and first curved section 115 curves through an angle of 180 degrees such that distal end 114 extends downward. In other embodiments, the first curved section of the hanger portion may form a bend having an angle in a range from 120° to 200°. Other angles are also possible.

In some embodiments, the first curved section and the second curved section of the bracket curve in opposite directions. For example, in bracket 100, first curved section 115 of hanger portion 100 curves toward the rear side of the bracket, while second curved section 135 of support portion 130 curves toward the front side of the bracket. Accordingly, when the hanger portion 110 is disposed over a rail and an item is cradled in support portion 130, the item sits in front of the rail.

As will be appreciated by those of ordinary skill in the art, the frame of the body can be formed from a variety of different materials. For example, frame 102 of bracket 100 is formed of a bent strip of metal, such as steel. The frame can also be formed of other metals, such as aluminum, that may be bent, cast or shaped in another manner. In other embodiments, the frame may be made of wood that is carved into the shape of the bracket. Still in other embodiments, the frame of the bracket may be formed of plastic, for example that is molded or extruded.

In some embodiments parts of the frame of the bracket can be lined with a cushioning material. In particular, in some embodiments, an internal surface of either the curved sections of the bracket may include a lining of cushioning material. Such a lining of cushioning material on the first curved section of the hanger portion can protect the rail from inadvertent scratches that might otherwise be caused by the bracket. Likewise, a lining of cushioning material on the internal surface of the second curved section of the support portion can protect the item being supported therein. As used herein, the internal surface should be understood as the surface of the bracket frame that is on the inside of the curve.

In some embodiments, the bracket may include a cushioning material that surrounds the frame. Such a cushioning material can protect both the item and railing on the inside and objects or people that may contact the bracket from the outside. The cushioning material can include rubber, neoprene, plastic, foam or any suitable material for protecting the item from abrasion. In some embodiments, the cushioning material can also act as a friction material to keep the item in place or to keep the bracket from inadvertently sliding on the rail, depending on the position of the cushioning material.

Bracket 100, shown in FIG. 1 includes several examples of the above-described cushioning material. At the upper end of bracket 100, a first lining of cushioning material 106 is disposed on the inside of first curved section 115. The lining of cushioning material 106 protects rail 105 from bracket 100 and prevents movement of the bracket along the rail. Bracket 100 also includes another lining of cushioning material 106 on the inside of second curved section 135 of the support portion 130. This second lining of cushioning material 106 can an item that is inserted into the support portion 130. In addition, support portion 130 also includes a cushioning material in the form of a cushioning sleeve 108 surrounding the frame 102. Like lining 106, cushioning sleeve 108 can also protect the item cradled in support portion 130. Further, cushioning sleeve 108 may also protect people or objects that may bump into the bracket 100.

Figure 2:
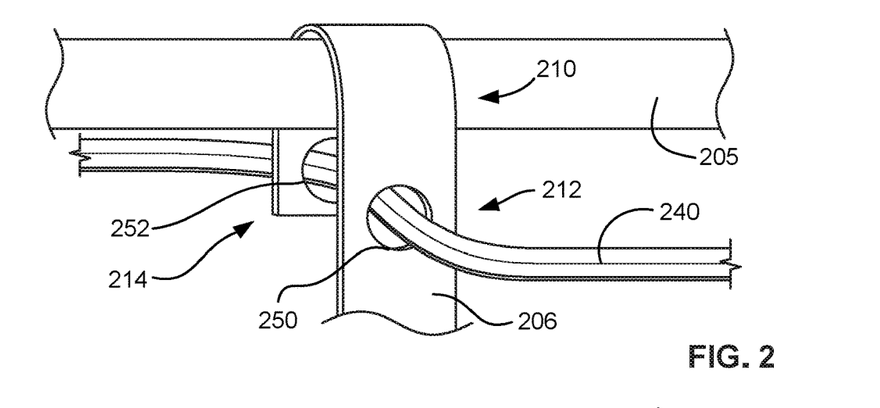
FIG. 2 is a detailed front perspective view of a hanger portion of a bracket secured on a rail with a retaining strap according to another embodiment of the disclosure.
Figure 3:
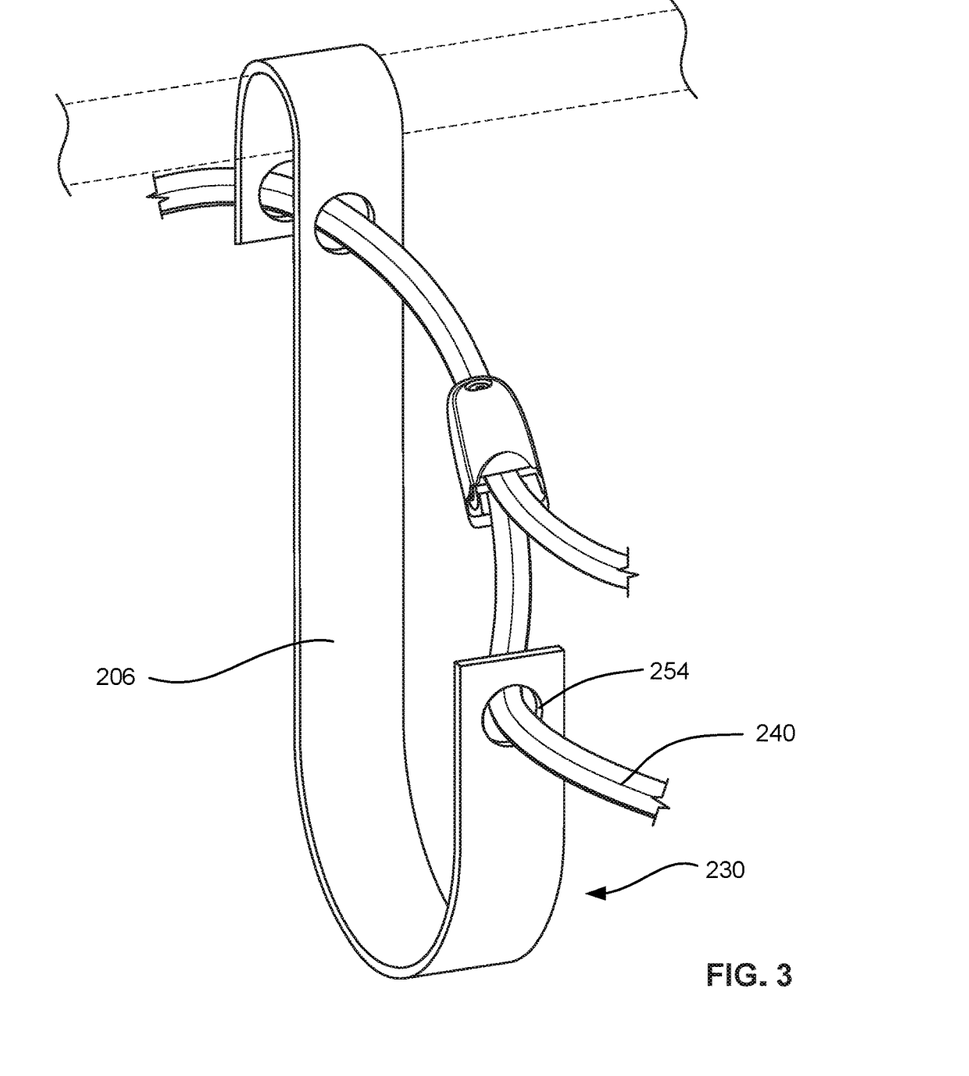
FIG. 3 is a front perspective view of the bracket and retaining strap of FIG. 2.
Figure 4:
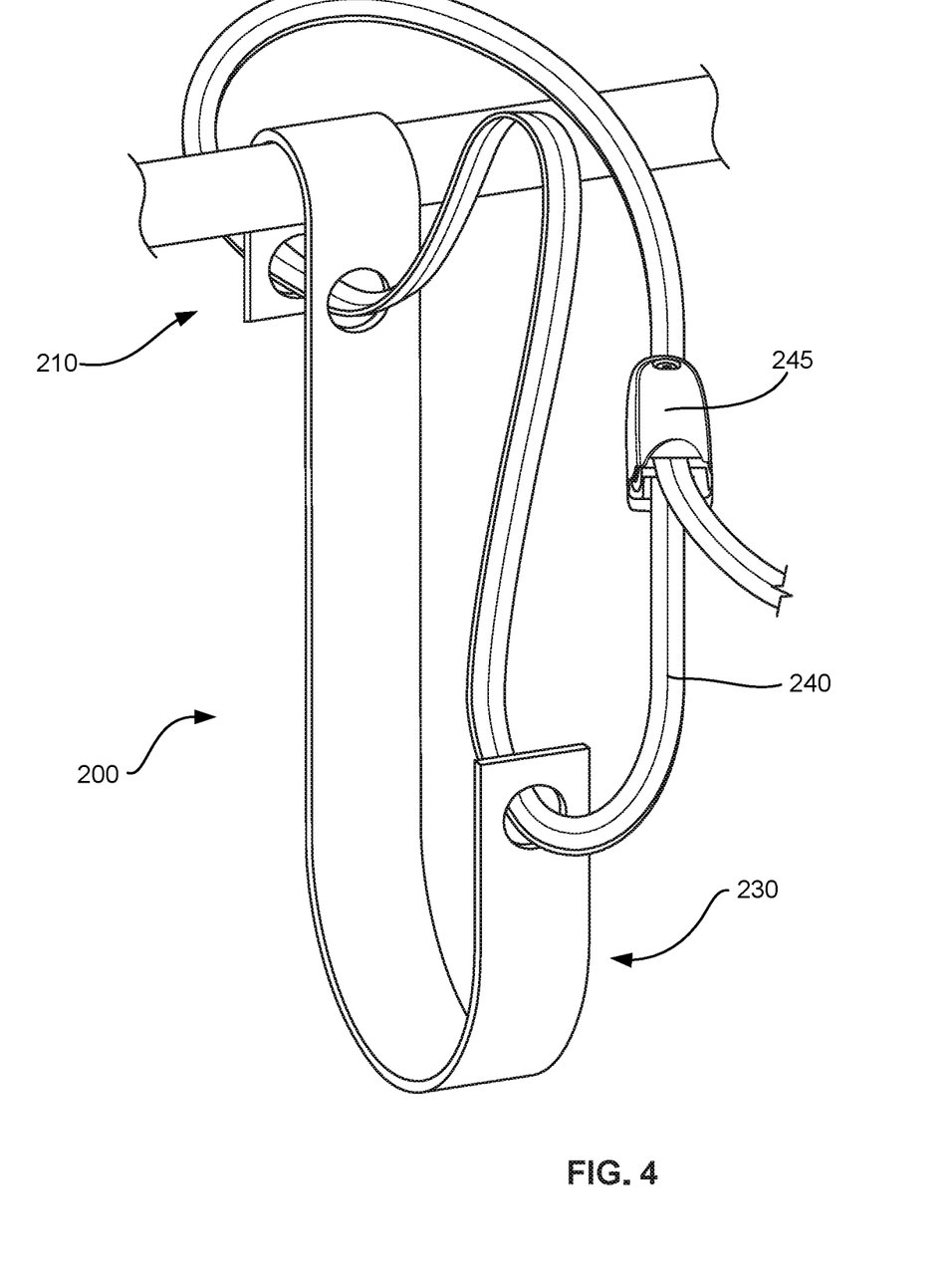
FIG. 4 is a front perspective view of the bracket and retaining strap of FIG. 3 in another configuration.

FIGS. 2-4 show front perspective views of another embodiment of a bracket 200 in combination with a retaining strap 240. FIG. 2 shows a detailed view of the engagement of a hanger portion 210 of bracket 200 on a rail 205 using retaining strap 240. The first curved section 215 of hanger portion 210 is wrapped over rail 205 in order to support the weight of bracket 200 on the rail. Retaining strap 240 is coupled to the distal end 214 of hanger portion 210, passes under rail 205, and extends through first hole 250 in the proximal end 212 of the hanger portion. The resulting configuration of the hanging apparatus forms a loop between hanger portion 215 and retaining strap 240 that surrounds rail 205. Accordingly, bracket 200 is securely held on rail 205.

In some embodiments, the first hole extends directly through the frame of the bracket. For example, in the embodiment in FIGS. 2-4, first hole 250 extends directly through the metal frame 206 that forms bracket 200. In other embodiments, the first hole is formed in an auxiliary member attached to the frame, such as an eyelet or buckle.

In some embodiments, the retaining strap is coupled to the distal end of the hanger portion of the bracket by passing through a second hole disposed at the distal end of the hanger portion. For example, as shown in FIG. 2, hanger portion 210 includes a second hole 252 disposed at its distal end. Retaining strap 240 extends through second hole 252 in order to form the loop that surrounds rail 205.

In some embodiments, the first hole and second hole of the hanger portion are arranged so that they are substantially coaxial. That is, the first hole and second hole can be substantially circular and share a common central axis. In other embodiments, the holes are less aligned, and are arranged so that they at least overlap along the same latitudinal axis. That is, the holes do not share a common central axis, but the central axis of at least one of the holes aligns with some portion of the other hole. The holes may be of the same or similar shape or size, or have different size or shape depending on the application.

In some embodiments, the first hole and second hole are arranged so that when the hanger portion is placed on a rail the first hole and second hole communicate directly below the rail. That is, when the hanger portion is on the rail, the first hole and second hole align under the rail so that when retaining strap is passed through the holes the strap contacts at least a portion of the rail. This contact will ensure that the bracket is tightly secured to the rail, and may limit the side-to-side movement of the bracket on the rail. In some embodiments, however, the contact with the rail is loose enough for the bracket to rotate axially around the rail.

While in some embodiments, the retaining strap is coupled to the distal end of the hanger portion by passing through a loop in the hanger portion, in other embodiments, the retaining strap is coupled to the distal end of the hanger portion by another method. For example, in some embodiments, the retaining strap is permanently attached to the distal end of the hanger portion. In certain embodiments, the retaining strap is attached to the hanger portion and passes through first and second holes in the hanger portion. In some embodiments, the retaining strap is capable of being the sole means for securing the bracket to the rail.

In certain embodiments, the strap is coupled to the support portion by passing through a hole in the support portion. For example, as illustrated in FIG. 3, the coupling between retaining strap 240 and the support portion 230 is formed by the retaining strap 240 passing through a third hole 254 disposed in a distal end of support portion 230. The location of the third hole 254 can be arranged so that when the item is placed on the support portion 230 and the retaining strap 240 is run through the first hole 250, the second hole 252 and the third hole 254, the item is secured to the bracket 200.

In some embodiments, the third hole can extend directly through the frame of the bracket. For example, third hole 254 extends directly through the frame 206 of bracket 200. In other embodiments, the support portion may include a hole in an auxiliary member attached to the frame, such as an eyelet, buckle or other structure including an aperture therethrough. Still in other embodiments, the retaining strap may be coupled to the support portion by another method. For example, in some embodiments the retaining strap is permanently fixed on the distal end of the support portion. In some embodiments, the retaining strap is capable of being the sole means of securing the item to the bracket.

In some embodiments, the retaining strap may form a closed loop to securely hold the item in the bracket. For example, as shown in FIG. 4, the retaining strap 240 doubles back to pass over an item held in the support portion 230 and secure the item therein. In some embodiments, the retaining strap includes a strap lock. For example, retaining strap 240 includes a strap lock 245. The strap lock 245 operates by inserting a free end of the strap therethrough, which allows the loop to be tightened around the item by pulling on the free end of the strap. Moreover, the strap can be locked in place once the item is secured, preventing theft or inadvertent removal from the bracket.

Figure 5:
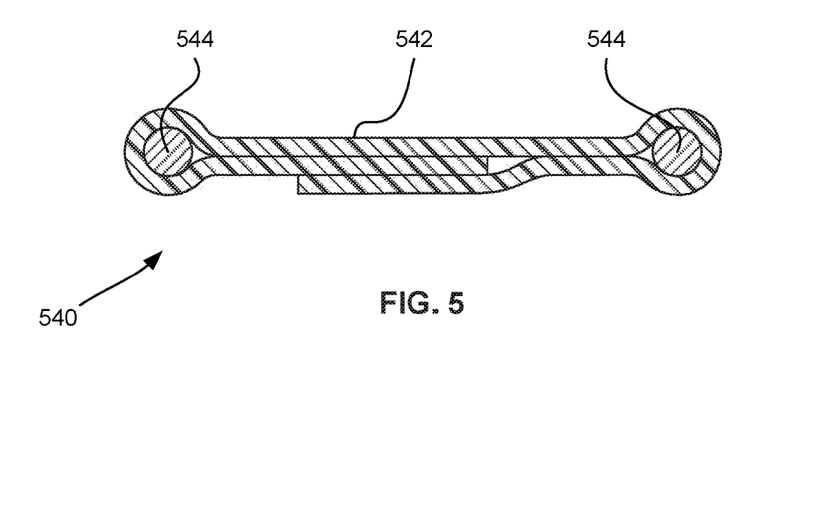
FIG. 5 is a cross sectional view of a retaining strap according to an embodiment of the disclosure.

The retaining strap can be made of any material known in the art suitable to hold the bracket to the rail and the item to the bracket. For example, the retaining strap can include woven fabric such as nylon or another synthetic material, leather, metal or a combination thereof. In some embodiments, the strap is made of a non-stretch material, while in other embodiments the strap can include an elastic material. The strap may also include a buckle or cinch device that can be used to fasten together the ends of the strap. The retaining strap may also include a locking mechanism, such as Thule locking strap no. 832. The strap may be selected so that it cannot be easily cut, thereby increasing the security of the apparatus and minimizing the opportunity for theft of the item. One embodiment of a cross section of a retaining strap is shown in FIG. 5. Retaining strap 540 is made of a nylon sleeve 542 that is wrapped around two metal cables 544. The cables add considerable strength to the retaining strap 540 and easy cutting or tearing of the strap.

In some embodiments the retaining strap is permanently attached to a point on the bracket, such as the hanger portion, elongated body or support portion. The type of attachment can be any known in the art for attaching a woven fabric, nylon or metal material to a metal, wood or plastic surface. For example, in some embodiments, the retaining strap is attached to the first hole of the bracket. In other embodiments, the hanger portion includes a second hole and the retaining strap is permanently attached to the second hole in the hanger portion. In other embodiments, the support portion includes a third hole, and the retaining strap is permanently attached to the third hole in the support portion. Still in other embodiments, the strap is not permanently attached to the bracket, but is attached in such a way that it is not easily removed. For example, in some embodiments, the strap may include a portion that is too large to pass through the first hole, second hole, or third hold, thus semi-permanently attaching the strap to the bracket. The bracket may also include a fourth hole for semi-permanently attaching the strap to the bracket, wherein the fourth hole is anywhere on the hanger portion, elongated body or support portion. In other embodiments, the strap is completely removable from the bracket so that the bracket and retaining strap are separable.

In some embodiments, the support portion extends approximately the entire length of the elongated body, and the elongated body and support portion of the bracket combine to form a substantially U-shaped design. In other embodiments, the support portion extends approximately half the length of the elongated body, and the elongated body and support portion of the bracket combine to form a substantially J-shaped design. The support portion may also extend less than approximately half the length of the elongated body, or less than approximately a quarter of the length of the elongated body.

In some embodiments, the curved sections include rounded bends in the bracket, while in other embodiments the curved sections have squared sections or angular bends. That is, instead of the first curved section of the hanger portion having a smooth, rounded design, in some embodiments the hanger portion includes right and/or obtuse angles. Similarly, the second curved section of the support portion may be comprised of right and/or obtuse angles.

In another aspect, a system for mounting an item on a horizontal rail is disclosed. The system may include:
  a bracket including:
    a hanger portion having a proximal end, a first curved section, a distal end, and a first hole extending through the proximal end;
    a support portion having a second curved section; and
    an elongated body extending from the hanger portion to the support portion;
  a retaining strap; and
  an item;
  wherein the hanger portion of the bracket is configured to hang on the substantially horizontal portion of the rail, the item is held in the support portion of the bracket, and the retaining strap is configured to secure the hanger portion to the rail and the item in the support portion, wherein the retaining strap is coupled to the distal end of the hanger portion and passes through the first hole so as to enclose the rail, and wherein the retaining strap passes over the item and is coupled to the support portion so as to enclose the item between the retaining strap and the support portion.

Figure 6:
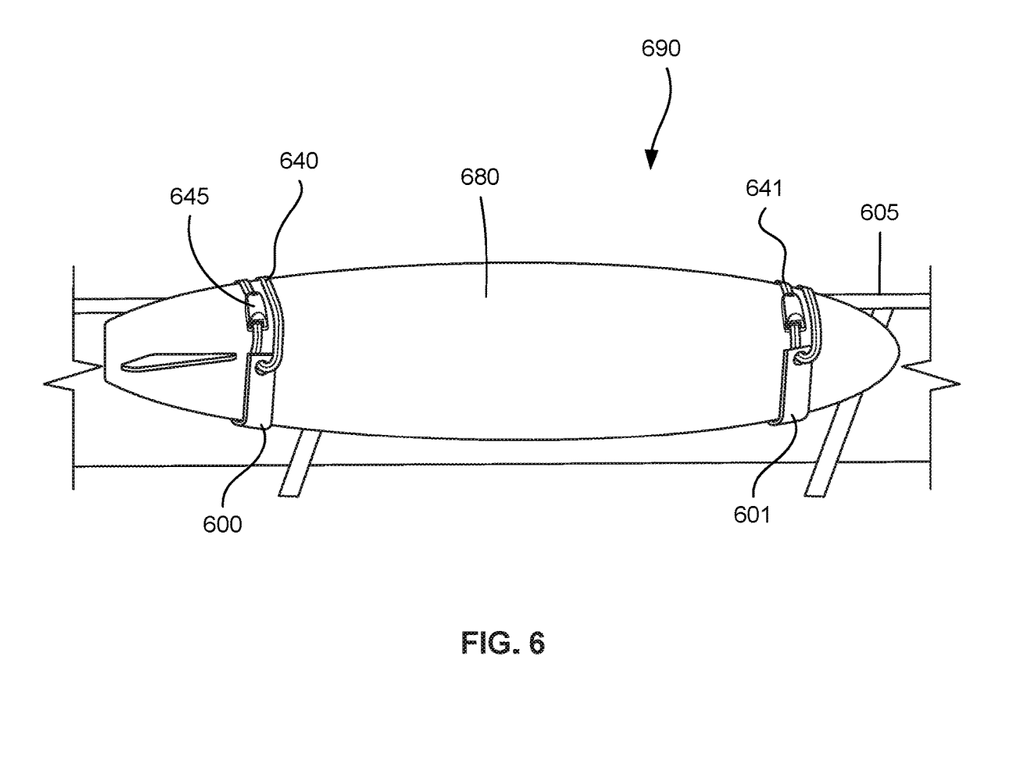
FIG. 6 is a system for holding an item on a rail according to an embodiment of the disclosure.

Such a system is shown, for example, in FIG. 6. System 690 includes a bracket 600 that holds an item 680 in the form of a surfboard on a rail 605. A retaining strap 640 loops over the surfboard 680 in order to securely hold it within the bracket. The retaining strap 640 includes a strap lock 645 to maintain the board in the bracket and prevent tampering. The board is prevented from moving within the bracket in either direction. The fin of the surfboard prevents the board from moving to the right, while the widening shape of the board prevents it from moving to the left.

In certain embodiments, the item can be any elongated object used for personal travel on a waterway, such as a surfboard, kayak or stand-up paddle board. The bracket, particularly the support portion can be sized to accommodate one or more surfboards (which are typically less than 3" thick, each) one or more paddle boards (which are typically 3-8" thick, each), a kayak (which are typically 1'-3' thick), or a rolled up floating mat (which are typically 2'-4' thick).

In some embodiments, the system may further include a second bracket and a second retaining strap. For example, system 690 uses a second bracket 601 and a second retaining strap 641 at the right side of the item 680. The combination of two brackets can be used to accommodate large items, optionally placing one on each side between the center point and the end. In embodiments where the item is a board that has a lesser width on the ends than in the middle, such as surfboard, the two brackets can increase the security of the system by locking the item in place so it cannot be easily slid in or out of the system.

Figure 7:
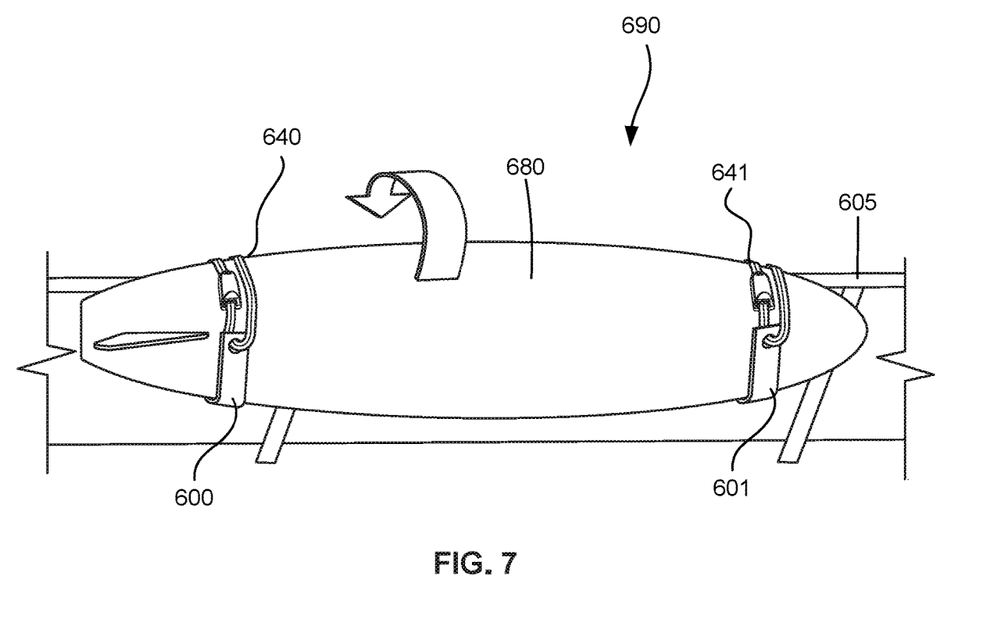
FIGS. 7 and 8 illustrate the movement of the system of FIG. 6 to another position.
Figure 8:
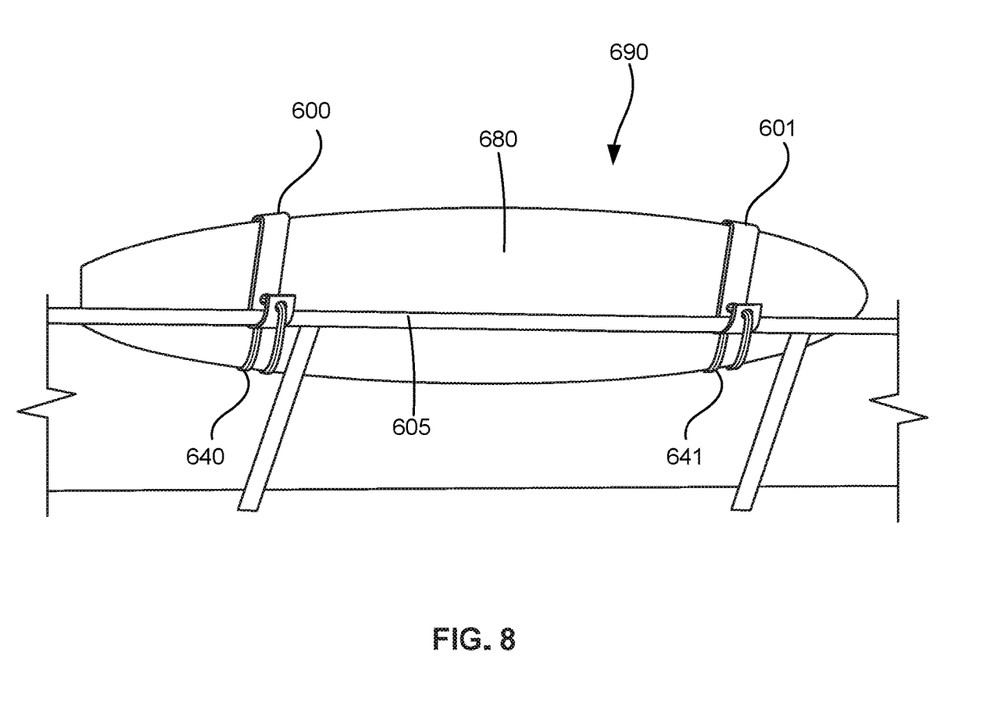

In some embodiments, the hanger portion is secured to the substantially horizontal portion of the rail so that the bracket is able to rotate axially around the rail. This allows the item to be easily moved from one side of the rail to the other. For example, FIGS. 7 and 8 illustrate that brackets 600 and 601 can be rotated forward and upward so that item 608 is pushed over rail 605. Item 600 is then held up by retaining straps 640 and 641. This ability allows the item to be placed on the more accessible side of the rail when in use, and rotated to the opposite side of the rail for storage and/or security, without having to remove the item or the bracket(s) from the system.

In another aspect, the invention provides a kit. The kit may include one or more brackets. The kit may also include one or more retaining straps. In some embodiments, the kit also includes a storage bag for the item.

What has been shown and discussed here includes examples that display and discuss specific configurations of components. Those artisans having an ordinary level of skill in this area will readily recognize that different configurations are possible by making minor modifications that are still within the general scope of what has been described here or that a greater or lesser number of components can be used for a specific implementation.

What is claimed:

1. An apparatus for mounting an item on a substantially horizontal portion of a rail, the apparatus comprising:
   a bracket comprising:
      a hanger portion comprising a proximal end, a first curved section, a distal end, a first hole extending through the proximal end, and a second hole extending through the distal end;
      a support portion comprising a second curved section; and
      an elongated body extending from the hanger portion to the support portion; and
   a retaining strap extending through the first hole of the hanger portion, extending through the second hole of the hanger portion, and coupled to the support portion,
   wherein the second curved section of the support portion is arranged so that when the item is placed on the support portion and the retaining strap is run through the first hole of the hanger portion, the item is surrounded by the support portion and the retaining strap such that the item is secured to the bracket, and
   wherein the first hole and second hole of the hanger portion are arranged so that when the hanger portion is placed on the substantially horizontal portion of the rail, the first hole and second hole are aligned directly below the rail.

2. The apparatus of claim 1, wherein the support portion includes a hole, and wherein the retaining strap is coupled to the support portion by extending through the hole of the support portion.

3. The apparatus of claim 1, wherein the retaining strap is permanently attached to the hanger portion of the bracket.

4. The apparatus of claim 1, wherein the retaining strap is permanently attached to the support portion of the bracket.

5. The apparatus of claim 1, wherein the retaining strap comprises a metal cable.

6. The apparatus of claim 1, wherein the retaining strap comprises a strap lock.

7. An apparatus for mounting an item on a substantially horizontal portion of a rail, the apparatus comprising:
   a bracket comprising:
      a hanger portion comprising a proximal end, a first curved section, a distal end, a first hole extending through the proximal end, and a second hole extending through the distal end, wherein the first hole and second hole are substantially coaxial;
      a support portion comprising a second curved section; and
      an elongated body extending from the hanger portion to the support portion; and
   a retaining strap coupled to the distal end of the hanger portion by extending through the second hole, extending through the first hole of the hanger portion, and coupled to the support portion.

8. An apparatus for mounting an item on a substantially horizontal portion of a rail, the apparatus comprising:
   a bracket comprising:
      a hanger portion comprising a proximal end, a first curved section, a distal end, and a first hole extending through the proximal end;
      a support portion comprising a second curved section; and
      an elongated body extending from the proximal end of the hanger portion to the support portion; and
   a retaining strap coupled to the distal end of the hanger portion, extending through the first hole of the hanger portion and coupled to the support portion,
   wherein the first curved section and first hole of the hanger portion are arranged so that when the hanger portion is placed over the substantially horizontal portion of the rail and the retaining strap is run through the first hole, the rail is surrounded by the hanger portion and the retaining strap such that the bracket is secured to the rail.

9. The apparatus of claim 8, wherein the second curved section of the support portion is arranged so that when the item is placed on the support portion and the retaining strap is run through the first hole of the hanger portion, the item is surrounded by the support portion and the retaining strap such that the item is secured to the bracket.

10. A system for mounting an item on a substantially horizontal portion of a rail, the system comprising:
   a bracket comprising
      a hanger portion comprising a proximal end, a first curved section, a distal end, and a first hole extending through the proximal end;
      a support portion comprising a second curved section; and
      an elongated body extending from the proximal end of the hanger portion to the support portion;
   a retaining strap; and
   an item;
   wherein the hanger portion of the bracket is configured to extend over and hang on the substantially horizontal portion of the rail, the item is held in the curved section of the support portion of the bracket, and the retaining strap is configured to secure the hanger portion to the rail and the item in the support portion, wherein the retaining strap is coupled to the distal end of the hanger portion and passes through the first hole so as to enclose the rail, and wherein the retaining strap passes over the item and is coupled to the support portion so as to enclose the item between the retaining strap and the support portion.

11. The system of claim 10, further comprising a second bracket and a second retaining strap configured to secure a second portion of the item to the rail.

12. The system of claim 10, wherein the distal end of the hanger portion includes a second hole, and wherein the retaining strap is coupled to the distal end of the hanger portion by extending through the second hole.

13. The system of claim 12, wherein the first hole and second hole of the hanger portion are arranged so that when the hanger portion is placed on a rail, the first hole and second hole are aligned below the rail.

14. The system of claim 10, wherein the hanger portion is secured to the rail so that the bracket is able to rotate axially around the rail.

15. The system of claim 10, wherein the retaining strap is permanently attached to the hanger portion of the bracket.

16. The system of claim 10, wherein the retaining strap is permanently attached to the support portion of the bracket.

17. The system of claim 10, wherein the retaining strap comprises a metal cable.

18. The system of claim 10, wherein the retaining strap comprises a strap lock.

* * * * *